United States Patent
Kobayashi

(10) Patent No.: US 12,431,789 B2
(45) Date of Patent: Sep. 30, 2025

(54) INTEGRATED CIRCUIT AND POWER SUPPLY CIRCUIT

(71) Applicant: FUJI ELECTRIC CO., LTD., Kawasaki (JP)

(72) Inventor: Yoshinori Kobayashi, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 286 days.

(21) Appl. No.: 18/342,464

(22) Filed: Jun. 27, 2023

(65) Prior Publication Data

US 2024/0039395 A1 Feb. 1, 2024

(30) Foreign Application Priority Data

Jul. 29, 2022 (JP) ................................ 2022-121713

(51) Int. Cl.
*H02M 3/335* (2006.01)
*H02M 1/00* (2007.01)
*H02M 1/088* (2006.01)
*H02M 1/32* (2007.01)

(52) U.S. Cl.
CPC .......... *H02M 1/327* (2021.05); *H02M 1/088* (2013.01); *H02M 3/33569* (2013.01)

(58) Field of Classification Search
CPC .. H02M 1/0035; H02M 1/0006; H02M 1/327; H02M 1/08; H02M 3/33571; H02M 3/33569

See application file for complete search history.

(56) References Cited

U.S. PATENT DOCUMENTS

| | | | |
|---|---|---|---|
| 2011/0032001 A1* | 2/2011 | Hasegawa | H02M 7/5387 327/1 |
| 2011/0127974 A1* | 6/2011 | Fukushi | H02M 3/156 323/271 |
| 2015/0236592 A1* | 8/2015 | Inoue | H02P 29/68 318/445 |
| 2020/0212837 A1* | 7/2020 | Ichikawa | A01G 3/062 |
| 2020/0386627 A1* | 12/2020 | Tokuda | G01K 7/20 |
| 2022/0045602 A1* | 2/2022 | Shiina | H02M 3/158 |
| 2022/0069696 A1* | 3/2022 | Takegami | H02M 1/007 |
| 2022/0149741 A1* | 5/2022 | Chen | G01K 3/005 |
| 2024/0022176 A1* | 1/2024 | Kobayashi | H02M 3/33569 |
| 2024/0136916 A1* | 4/2024 | Liu | G01R 19/04 |

FOREIGN PATENT DOCUMENTS

JP 2012-110173 A 6/2012

* cited by examiner

*Primary Examiner* — Sisay G Tiku
(74) *Attorney, Agent, or Firm* — RABIN & BERDO, P.C.

(57) ABSTRACT

An integrated circuit for a power supply circuit that includes a detection resistor. The integrated circuit includes: a first pad; a first terminal coupled to the detection resistor, the first terminal being electrically connected to the first pad in a first case, and being electrically separated from the first pad in a second case; a first temperature detection circuit having a temperature detection element, and being configured to detect a first temperature based on a voltage of the temperature detection element; a second temperature detection circuit configured to detect a second temperature of the integrated circuit, based on a first voltage corresponding to a resistance value of the detection resistor, received through the first pad in the first case; and a circuit configured to operate based on results of detection of the second and first temperature detection circuits, respectively in the first case and in the second case.

8 Claims, 13 Drawing Sheets

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2022-121713 filed on Jul. 29, 2022, the entire disclosure of which is hereby incorporated by reference herein.

BACKGROUND

Technical Field

The present disclosure relates to an integrated circuit and a power supply circuit.

Description of the Related Art

Japanese Patent Application Publication No. 2012-110173 discloses a power supply circuit that generates an output voltage of a target level from an input voltage thereof.

Incidentally, an integrated circuit that controls switching of a power transistor in such a power supply circuit generally includes a temperature detection circuit that detects whether a temperature is higher than a predetermined temperature. The temperature detection circuit may use a temperature detection element provided in the integrated circuit or may use a thermistor external to the integrated circuit. When the temperature detection element is used, it is difficult to change a predetermined temperature.

Meanwhile, when the thermistor is used, it is possible to flexibly change the predetermined temperature by selecting the thermistor, but a terminal dedicated thereto needs to be provided in the integrated circuit.

SUMMARY

A first aspect of an embodiment of the present disclosure is to provide an integrated circuit for a power supply circuit that includes a detection resistor having a resistance value for temperature detection, the integrated circuit comprising: a first pad; a first terminal configured to be electrically connected to the detection resistor and the first pad in a first case, and be electrically separated from the first pad in a second case; a first temperature detection circuit having a temperature detection element, the first temperature detection circuit being configured to detect a first temperature, based on a voltage of the temperature detection element; a second temperature detection circuit configured to detect a second temperature, based on a first voltage corresponding to the resistance value of the detection resistor, received through the first pad in the first case; and a circuit configured to operate based on a result of detection of the second temperature detection circuit and that of the first temperature detection circuit, respectively in the first case and in the second case.

A second aspect of an embodiment of the present disclosure is to provide a power supply circuit configured to generate an output voltage at a target level from an input voltage thereof, the power supply circuit comprising: an inductor; first and second transistors configured to control an inductor current flowing through the inductor; an integrated circuit having a first terminal, the integrated circuit being configured to control switching of the first and second transistors; and a detection resistor for temperature detection coupled to the first terminal, wherein the integrated circuit includes a first temperature detection circuit having a temperature detection element, the first temperature detection circuit being configured to detect whether a first temperature of the integrated circuit is higher than a first predetermined temperature, based on a voltage of the temperature detection element, a second temperature detection circuit configured to detect whether a second temperature of the integrated circuit is higher than a second predetermined temperature, based on a first voltage corresponding to a resistance value of the detection resistor, a switching control circuit configured to stop the switching of the first and second transistors, in response to the first temperature detection circuit detecting the first predetermined temperature or the second temperature detection circuit detecting the second predetermined temperature.

BRIEF DESCRIPTION OF THE DRAWINGS

FIG. 2 is a diagram for explaining a control block 35a.

FIG. 3 is a diagram illustrating an example of a control IC 50a.

FIG. 9 is a diagram for explaining main waveforms in a control block 35a.

DETAILED DESCRIPTION

Figure 1:
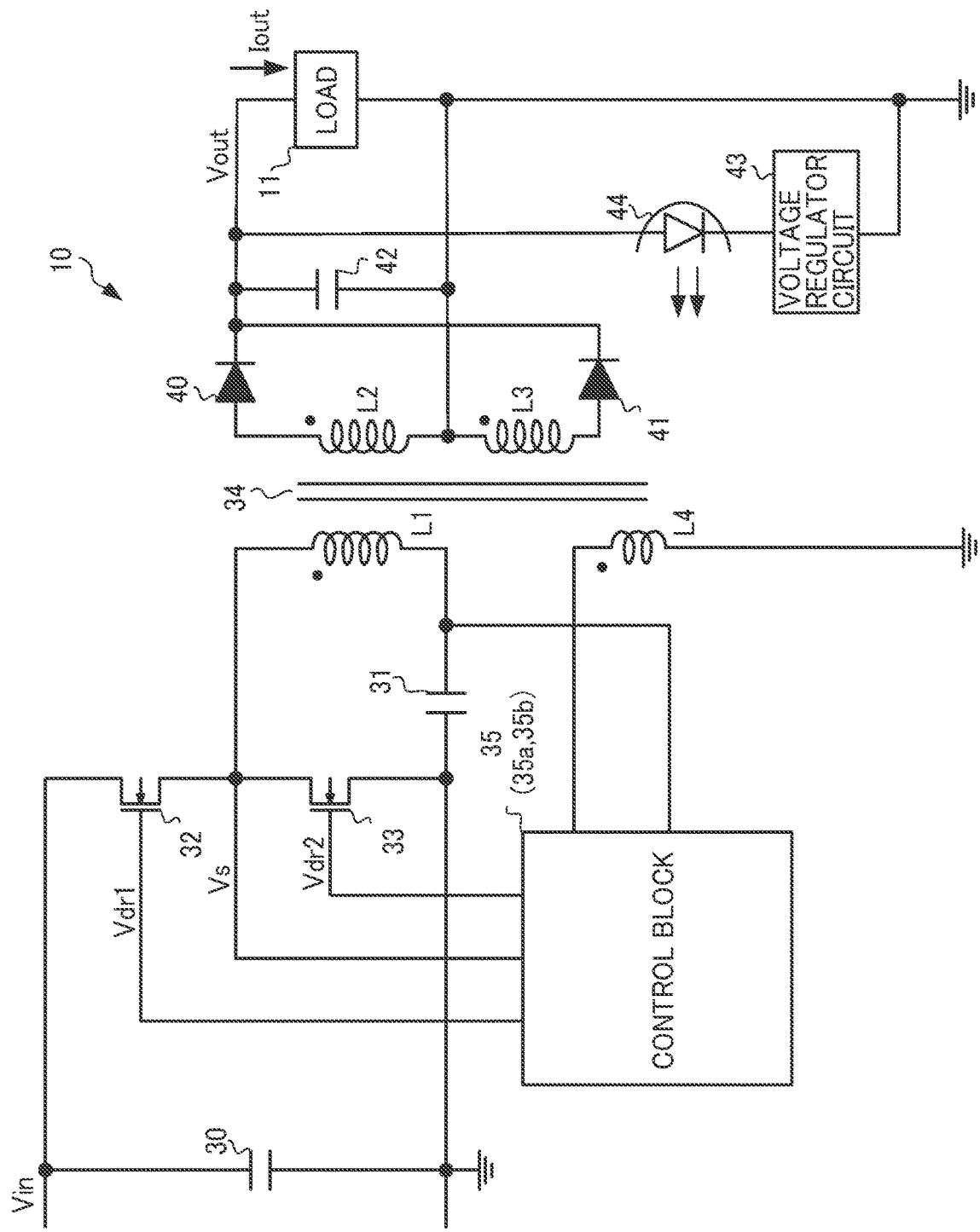
FIG. 1 is a diagram illustrating an example of a power supply circuit 10.

At least following matters will become apparent from the descriptions of the present specification and the accompanying drawings.

Herein, elements, members, and the like that are the same as or equivalent to those illustrated in the drawings are given the same reference numerals or signs and redundant description thereof is omitted. Further, in embodiments of the present disclosure, when the term "couple" is used, it means to "electrically couple" unless otherwise noted. Accordingly, the term "couple" includes a case in which two components are coupled through not only wiring but also a resistor, for example.

Embodiments

<<<Overview of DC-DC Converter 10>>>

FIG. 1 is a diagram illustrating an example of a DC-DC converter 10 according to an embodiment of the present disclosure. The DC-DC converter 10 is an LLC current resonant power supply circuit that generates an output voltage Vout of a target level (e.g., 12 V) at a load 11 from a predetermined input voltage Vin (e.g., 400 V).

The DC-DC converter 10 includes capacitors 30, 31, 42, NMOS transistors 32, 33, a transformer 34, a control block 35, diodes 40, 41, a voltage regulator circuit 43, and a light-emitting diode 44.

The capacitor 30 stabilizes a voltage between a power supply line that receives the input voltage Vin and a ground line on the ground side, and removes noise and the like. Note that the input voltage Vin is a direct-current voltage (DC voltage) at a predetermined level.

The NMOS transistor 32 is a high-side (power-supply-side) power transistor, and the NMOS transistor 33 is a low-side (ground-side) power transistor. Note that, in an embodiment of the present disclosure, the NMOS transistors 32, 33 are used as a switching device, however, for example, PMOS transistors or bipolar transistors may be used.

The transformer 34 includes a primary coil L1, secondary coils L2, L3, and an auxiliary coil L4, where the primary coil L1, the secondary coils L2, L3, and the auxiliary coil L4 are insulated from one another. In the transformer 34, a voltage is generated at the secondary coils L2 and L3 on the secondary side according to a variation in the voltage across the primary coil L1 on the primary side, and a voltage is generated at the auxiliary coil L4 on the primary side according to a variation in the voltage of the secondary coils L2 and L3.

The primary coil L1 has one end coupled to the source of the NMOS transistor 32 and the drain of the NMOS transistor 33, and the other end coupled to the source of the NMOS transistor 33 through the capacitor 31.

Accordingly, in response to switching of the NMOS transistors 32, 33 being started, the voltage of the secondary coils L2, L3 and the voltage of the auxiliary coil L4 vary. Note that the primary coil L1 and the secondary coils L2, L3 are electromagnetically coupled with the same polarity, and the secondary coils L2, L3 and the auxiliary coil L4 are also electromagnetically coupled with the same polarity.

The control block 35 is a circuit block that controls switching of the NMOS transistors 22, 23, which will be described later in detail.

The diodes 40, 41 rectify the voltage of the secondary coils L2, L3, and the capacitor 42 smooths the rectified voltage. As a result, the smoothed output voltage Vout is generated at the capacitor 42. Note that the output voltage Vout results in a DC voltage at the target level (e.g., 12 V).

The voltage regulator circuit 43 generates a constant DC voltage, and is configured using a shunt regulator, for example.

The light-emitting diode 44 is a device that emits light having an intensity according to a difference between the output voltage Vout and the output of the voltage regulator circuit 43, and configures a photocoupler with a phototransistor (not illustrated) which will be described later. In an embodiment of the present disclosure, as the level of the output voltage Vout rises, the intensity of the light from the light-emitting diode 44 increases.

In an embodiment of the present disclosure, the NMOS transistor 32 corresponds to a "first transistor on the power supply side", and the NMOS transistor 33 corresponds to a "second transistor on the ground side". Further, the primary coil L1 corresponds to an "inductor", and the current flowing through the primary coil corresponds to an "inductor current".

First Embodiment of Control Block 35

Figure 2:
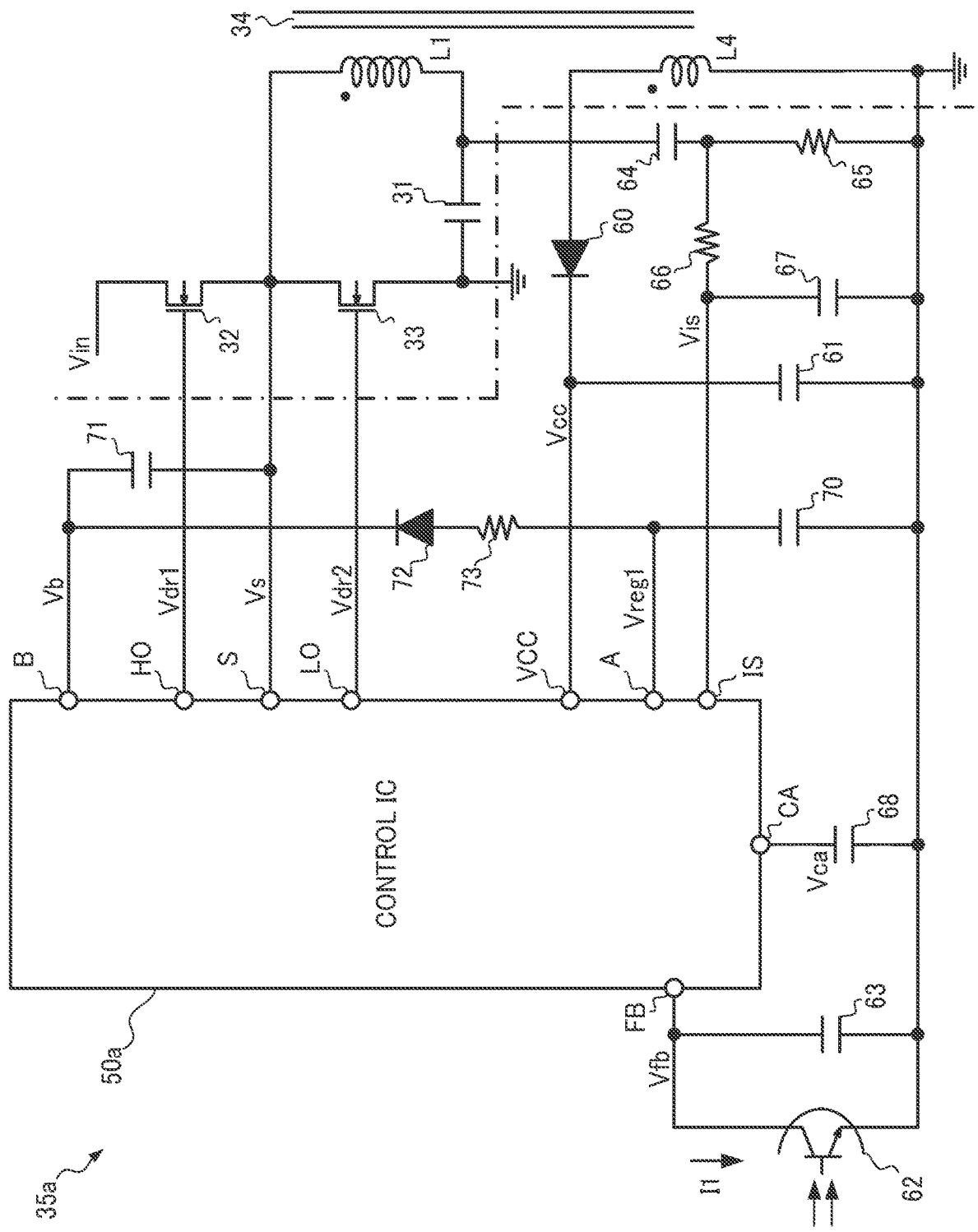

FIG. 2 is a diagram illustrating an example of a control block 35a which is a first embodiment of the control block 35. In FIG. 2, a configuration included in a region on the left side relative to a dashed-dotted line in a paper plane corresponds to the control block 35a. Note that the control block 35a controls the DC-DC converter 10 using an internal regulator, which will be described later in detail.

The control block 35a includes a control IC 50a, diodes 60, 72, capacitors 61, 63, 64, 67, 68, 70, 71, a phototransistor 62, and resistors 65, 66, 73.

The control IC 50a is an integrated circuit that controls switching of the NMOS transistors 32, 33, and has terminals VCC, FB, IS, CA, A, S, B, HO, LO. Note that the control IC 50a also has a terminal to be grounded, for example, (so-called, ground terminal), however, only a part of terminals is illustrated here, for convenience.

The terminal VCC is a terminal to receive a power supply voltage Vcc to operate a control IC 50. The cathode of the diode 60 and one end of the capacitor 61 having the other end that is grounded are coupled to the terminal VCC. Further, the anode of the diode 60 is coupled to the auxiliary coil L4.

The capacitor 61 is charged in response to the control IC 50a starting to switch the NMOS transistors 32, 33, which will be described later in detail. Then, the charge voltage of the capacitor 61 will be the power supply voltage Vcc to operate the control IC 50a.

The terminal FB is a terminal at which a feedback voltage Vfb corresponding to the output voltage Vout is generated, and to which the phototransistor 62 and the capacitor 63 are coupled. The phototransistor 62 passes a bias current I1 having a magnitude according to the intensity of the light from the light-emitting diode 44 of FIG. 1, from the terminal FB to the ground, and the capacitor 63 is provided to remove noise between the terminal FB and the ground. Thus, the phototransistor 62 operates as a transistor to generate a sink current.

The terminal IS is a terminal to receive a voltage corresponding to the resonant current of the DC-DC converter 10. Here, a voltage corresponding to the current value of the resonant current of the primary coil L1 is generated at a node at which the capacitor 64 and the resistor 65 are coupled. The resistor 66 and the capacitor 67 configure a low-pass filter. Thus, the terminal IS receives a voltage Vis, with its noise component removed, corresponding to the current value of the resonant current of the primary coil L1.

Note that the current value of the resonant current increases according to the input power of the DC-DC converter 10. Further, the input power of the DC-DC converter 10 increases according to the power consumed at the load 11. Accordingly, the voltage Vis to be applied to the terminal IS indicates a voltage corresponding to the power consumption of the load 11.

From the terminal CA, a voltage Vca varying according to the voltage Vis at the terminal IS is applied to the capacitor 68.

The terminal A is a terminal to receive a voltage Vreg1 from a regulator (described later) provided inside the control IC 50a. The capacitor 70 for stabilizing the voltage Vreg1 is coupled to the terminal A.

The terminal S is a terminal to receive the voltage at the coupling point between the NMOS transistor 32 on the power supply side and the NMOS transistor 33 on the ground side. In an embodiment of the present disclosure, upon turning on of the NMOS transistor 32, the voltage Vin is applied to the terminal S, and upon turning on of the NMOS transistor 33, a ground voltage is applied thereto. In an embodiment of the present disclosure, that the voltage at the terminal S is referred to as voltage Vs. Accordingly, the voltage Vs varies in a range between the voltage Vin and 0 (zero) V.

The terminal B is a terminal to receive a voltage for turning on the NMOS transistor 32 on the power supply side. One end of the capacitor 71 having the other end coupled to the terminal S is coupled to the terminal B. Further, the diode 72 and the resistor 73 are coupled to the terminal B. In an embodiment of the present disclosure, the cathode of the diode 72 is coupled to the terminal B, and the anode thereof is coupled to the capacitor 70 through the resistor 73.

Accordingly, in response to the voltage Vs at the terminal S reaching the ground voltage (0 V), the capacitor 71 is charged with the current from the regulator (described later), internal to the control IC 50a, coupled to the terminal A. Meanwhile, in response to the voltage Vs at the terminal S reaching the voltage Vin, a voltage Vb at the terminal B reaches a voltage higher than the voltage Vin by an amount corresponding to the charge voltage at the capacitor 71. Accordingly, the capacitor 71 is an element to generate a so-called bootstrap voltage.

The terminal HO is a terminal from which a driving signal Vdr1 for driving the NMOS transistor 32 is outputted and to which the gate of the NMOS transistor 32 is coupled.

The terminal LO is a terminal from which a driving signal Vdr2 for driving the NMOS transistor 33 is outputted and to which the gate of the NMOS transistor 33 is coupled.

<<<Details of control IC 50a>>>

Figure 3:
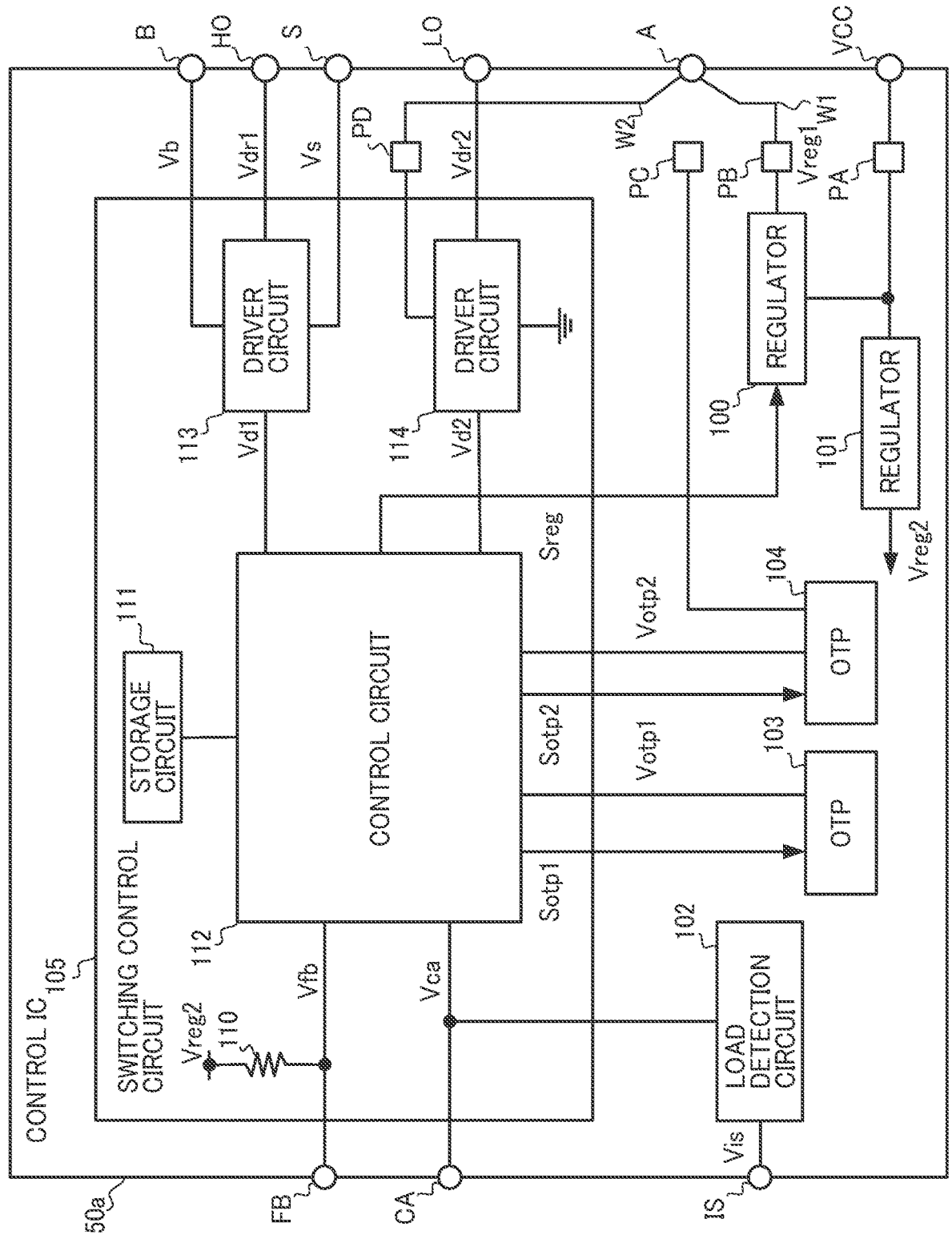

FIG. 3 is a diagram illustrating an example of the control IC 50a. The control IC 50a includes regulators 100, 101, a load detection circuit 102, overheat protection circuits 103, 104, a switching control circuit 105, and pads PA to PD. Here, the term "pad" indicates an electrode to be coupled to a predetermined node of a predetermined circuit, and a bonding wire (hereinafter, referred to as wire) is coupled thereto.

===Pad PA===

The pad PA is an electrode to which a wire from the terminal VCC is coupled. Thus, the power supply voltage Vcc is applied to the pad PA. Further, in an embodiment of the present disclosure, the pad PA is coupled to each of the regulators 100, 101 with metal wiring, for example. Accordingly, the power supply voltage Vcc is supplied to the regulators 100, 101 through the pad PA.

===Regulator 100

Figure 4:
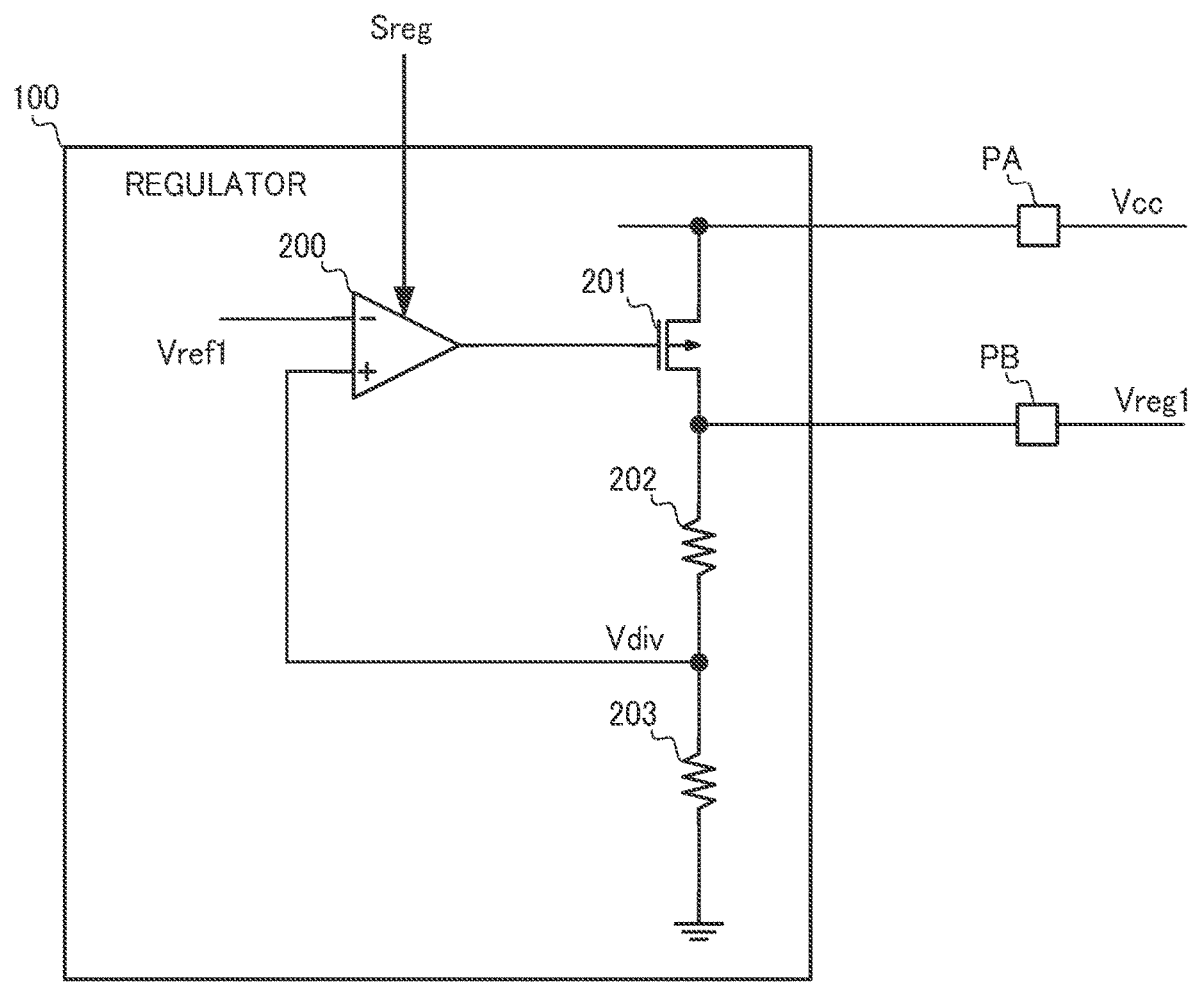
FIG. 4 is a diagram illustrating an example of a regulator 100.

The regulator 100 is a power supply circuit that generates the voltage Vreg1 (e.g., 10 V) with respect to the pad PB, based on the power supply voltage Vcc. The regulator 100 includes an operational amplifier 200, a PMOS transistor 201, and resistors 202, 203, as illustrated in FIG. 4.

The operational amplifier 200 adjusts the gate voltage of the PMOS transistor 201 such that a voltage Vdiv at the coupling point between the resistors 202 and 203 will reach a reference voltage Vref1 applied to the inverting input thereof. As a result, the PMOS transistor 201 applies the voltage Vreg1 at a predetermined level to the pad PB.

Here, in the control IC 50a according to an embodiment of the present disclosure, the pad PB and the terminal A are coupled with a wire W1, as illustrated in FIG. 3. Accordingly, the voltage Vreg1 is applied to the terminal A through the pad PB.

Further, the regulator 100 according to an embodiment of the present disclosure generates the voltage Vreg1 in response to a signal Sreg at a high level (hereinafter, referred to as high or high level) from the switching control circuit 105, and stops generating the voltage Vreg1 in response to the signal Sreg at a low level (hereinafter, referred to as low or low level). Note that the voltage Vreg1 corresponds to a "second voltage".

===Regulator 101===

The regulator 101 is a power supply circuit that generates a voltage Vreg2 (e.g., 5 V) to operate various circuits internal to the control IC 50a, based on the power supply voltage Vcc. Here, the "various circuits" indicate the load detection circuit 102, the overheat protection circuits 103, 104, and the switching control circuit 105. Note that the regulator 101 is the same as the regulator 100, and thus the detailed description thereof is omitted here.

===Load Detection Circuit 102===

The load detection circuit 102 detects the state of the load 11 (here, power consumption of the load 11). Specifically, the load detection circuit 102 applies the voltage Vca corresponding to a load current Iout flowing through the load 11, based on the voltage Vis applied to the terminal IS.

===Overheat Protection Circuit 103===

Figure 5:
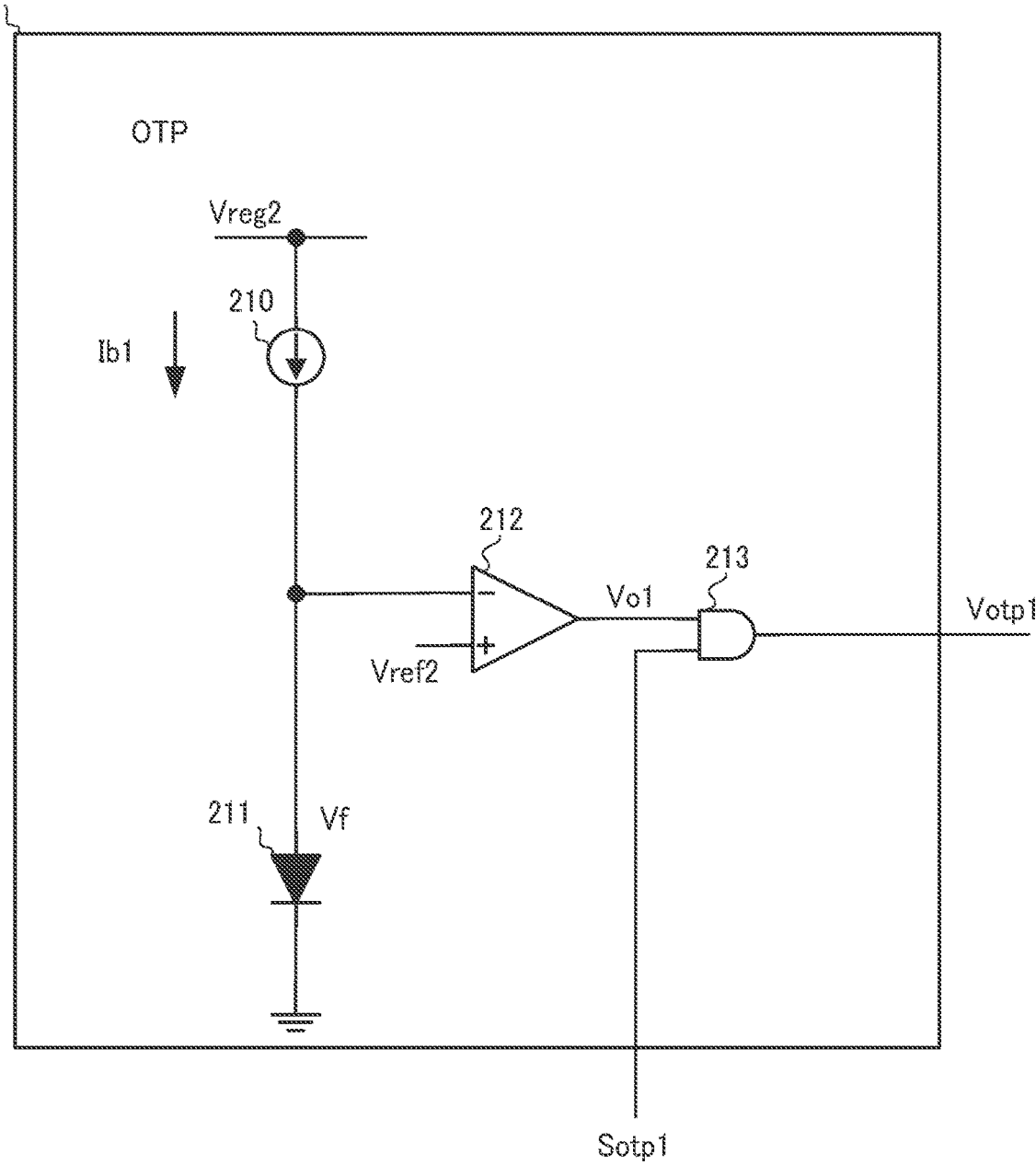
FIG. 5 is a diagram illustrating an example of an overheat protection circuit 103.

The overheat protection circuit (OTP) 103 protects the DC-DC converter 10, in response to the temperature of the control IC 50a exceeding a predetermined temperature Ta (e.g., 125° C.). The overheat protection circuit 103 includes a current source 210, a diode 211, a comparator 212, and an AND circuit 213, as illustrated in FIG. 5.

The current source 210 supplies a predetermined current Ib1 to the diode 211. The diode 211 has characteristics that a forward voltage Vf drops upon a rise in the temperature. Note that the diode 211 corresponds to a "temperature detection element".

The comparator 212 compares the forward voltage Vf varying according to the temperature and a reference voltage Vref2 corresponding to the predetermined temperature Ta, to thereby output a comparison result Vo1. Specifically, the comparator 212 outputs a low voltage Vo1 indicating that the temperature (here, the temperature of the diode 211) is lower than the predetermined temperature Ta, in response to the forward voltage Vf being higher than the reference voltage Vref2. Meanwhile, the comparator 212 outputs a high voltage Vo1 indicating that the temperature is higher than the predetermined temperature Ta, in response to the forward voltage Vf being lower than the reference voltage Vref2.

The AND circuit 213 outputs the result of comparison of the comparator 212 as a voltage Votp1, upon receiving a high signal Sotp1 to operate the overheat protection circuit 103 from the switching control circuit 105. Note that when the signal Sotp1 is low, the overheat protection circuit 103 always outputs the low voltage Votp1.

Here, the overheat protection circuit 103 corresponds to a "first temperature detection circuit", and the predetermined temperature Ta corresponds to a "first predetermined temperature".

===Overheat Protection Circuit 104===

Figure 6:
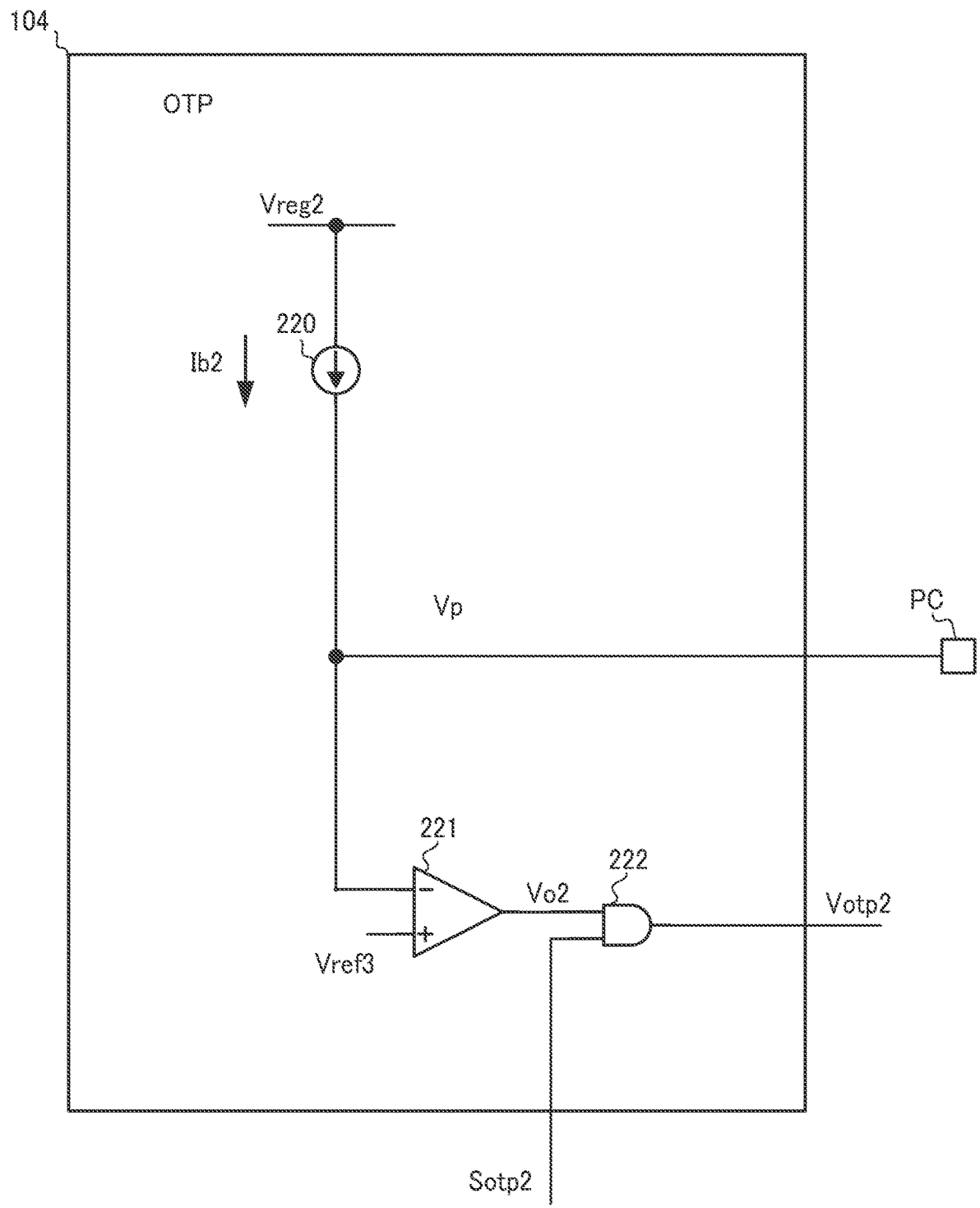
FIG. 6 is a diagram illustrating an example of an overheat protection circuit 104.

The overheat protection circuit (OTP) 104 protects the DC-DC converter 10, in response to the temperature of a thermistor (described later) external to the control IC 50a coupled thereto exceeding a predetermined temperature Tb (e.g., 110° C.). The overheat protection circuit 104 includes a current source 220, a comparator 221, and an AND circuit 222, as illustrated in FIG. 6.

The current source 210 supplies a predetermined current Ib2 to the pad PC. Further, a node on the downstream side relative to the current source 220 is coupled to the inverting input terminal of the comparator 221. Accordingly, for example, when the pad PC is coupled to an external thermistor (described later) through the terminal A, a voltage corresponding to the resistance value of the thermistor (described later) is applied to the inverting input terminal of the comparator 221. Note that the voltage of the pad PC is referred to as a voltage Vp, here.

Further, in the control IC 50a of FIG. 3, the pad PC is in a so-called open state. Accordingly, in the control IC 50a, the voltage Vp at the node (i.e., the inverting input terminal of the comparator 221) on the downstream side relative to the current source 220 rises substantially to the voltage Vreg2 at the node on the power supply side relative to the current source 210. Further, the thermistor coupled to the terminal A has characteristics that a resistance value decreases upon a rise in the temperature, which will be described later in detail.

The comparator 221 compares the voltage Vp and a reference voltage Vref3 corresponding to the predetermined temperature Tb, to thereby output a comparison result Vo2. Specifically, the comparator 221 outputs a low voltage Vo2 indicating that the temperature (here, the temperature of the thermistor) is lower than the predetermined temperature Tb, in response to the voltage Vp being higher than the reference voltage Vref3. Meanwhile, the comparator 221 outputs a high voltage Vo2 indicating that the thermistor temperature is higher than the predetermined temperature Tb, in response to the voltage Vp being lower than the reference voltage Vref3. Note that when the pad PC is in the so-called open state, the comparator 221 outputs the low voltage Vo2.

The AND circuit 222 outputs the result of comparison of the comparator 221 as a voltage Votp2, upon receiving a high signal Sotp2 to operate the overheat protection circuit 104 from the switching control circuit 105. Note that when the signal Sotp2 is low, the overheat protection circuit 104 always outputs the low voltage Votp2.

Here, the overheat protection circuit 104 corresponds to a "second temperature detection circuit", and the predetermined temperature Tb corresponds to a "second predetermined temperature". Further, in an embodiment of the present disclosure, the predetermined temperature Tb is a temperature lower than the predetermined temperature Ta. Further, the voltage Vp corresponds to a "first voltage".

===Switching Control Circuit 105===

The switching control circuit 105 of FIG. 3 controls switching of the NMOS transistors 32, 33 as well as integrally controls the control IC 50a. The switching control circuit 105 includes a resistor 110, a storage circuit 111, a control circuit 112, and driver circuits 113, 114.

<<Resistor 110>>

The resistor 110 is an element to generate, at the terminal FB, the feedback voltage Vfb according to the bias current I1 of the phototransistor 62 of FIG. 2, and has one end to receive the voltage Vreg2, and the other end coupled to the terminal FB.

Note that, in an embodiment of the present disclosure, in response to the output voltage Vout exceeding the target level, the intensity of the light from the light-emitting diode 44 increases, and the bias current I1 increases. Thus, the feedback voltage Vfb drops. Meanwhile, in response to the output voltage Vout dropping below the target level, the intensity of the light from the light-emitting diode 44 decreases and the bias current I1 decreases. Thus, the feedback voltage Vfb rises.

<<Storage Circuit 111

The storage circuit 111 stores various types of information indicating the operating conditions of the control IC 50a, for example. Here, the "various types of information" include information for outputting the above described signals Sreg, Sotp1, Sotp2 to the control circuit 112. Note that the storage circuit 111 includes a register and/or memory, for example.

<<Control Circuit 112>>

The control circuit 112 outputs the signals Sreg, Sotp1, Sotp2, based on the information stored in the storage circuit 111. Further, the control circuit 112 outputs the signals Vd1, Vd2 for controlling on/off of the NMOS transistors 32, 33, respectively, based on the feedback voltage Vfb corresponding to the output voltage Vout and the voltage Vca corresponding to a load current Iout of the load 11.

Although the details will be described later, in an embodiment of the present disclosure, the NMOS transistor 32 is turned on in response to the signal Vd1 going high, and is turned off in response to the signal Vd1 going low. Further, the NMOS transistor 33 is tuned on in response to the signal Vd2 going high, and is turned off in response to the signal Vd2 going low.

Further, the control circuit 112 operates in a normal mode, when it is determined that the load 11 is not in the light load state based on the voltage Vca, and operates in a burst mode, when it is determined that the load 11 is in the light load state. Note that the load 11 being in the light load state indicates, for example, that the load current Iout is equal to or lower than a predetermined current (e.g., 100 mA).

Figure 7:
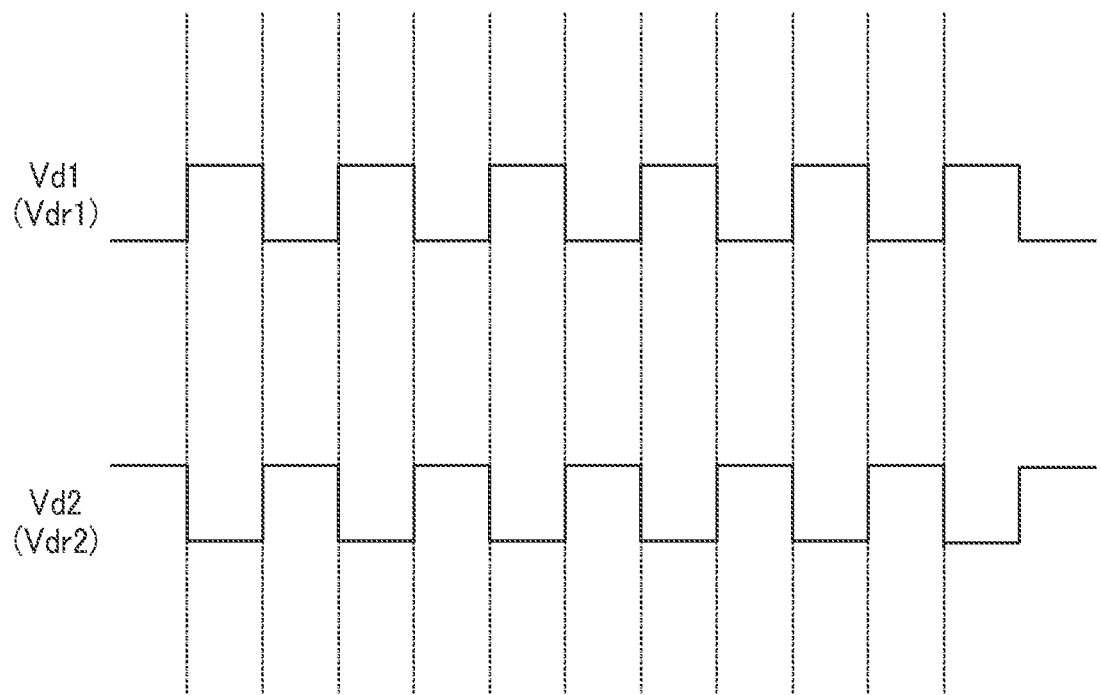
FIG. 7 is a diagram of an example illustrating signals Vd1, Vd2 in a normal mode.

Here, the "normal mode" indicates an operation mode in which the NMOS transistors 32, 33 are continuously switched, as illustrated in FIG. 7. Note that, in this event, the control circuit 112 outputs the pulsed signals Vd1, Vd2 having a frequency determined by the level of the feedback voltage Vfb and having a constant duty cycle (e.g., 50%).

Figure 8:
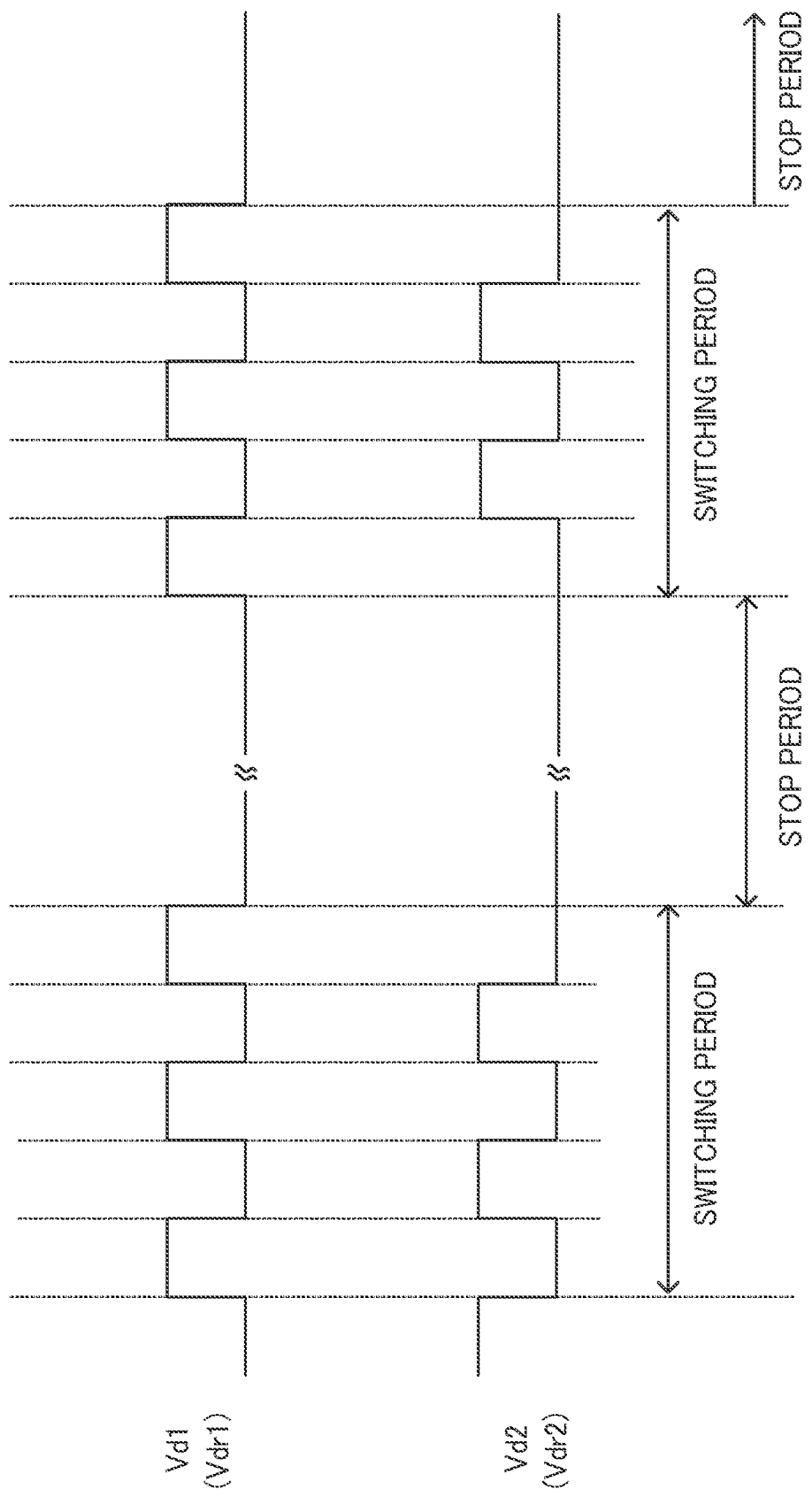
FIG. 8 is a diagram of an example illustrating signals Vd1, Vd2 in a burst mode.

Further, the "burst mode" indicates an operation mode in which a switching period during which the NMOS transistors 32, 33 are continuously switched and a stop period during which switching thereof is intermittently stopped are alternatively repeated, as illustrated in FIG. 8. Note that the frequency of the signals Vdr1, Vdr2 in this event is also determined by the level of the feedback voltage Vfb.

Note that the control circuit 112 changes the signal Vd1 and the signal Vd2 in a complementary manner, while providing a dead time, such that the NMOS transistors 32, 33 are not on concurrently in both the normal mode and the burst mode.

Further, the control circuit 112 according to an embodiment of the present disclosure changes both the signals Vd1, Vd2 to low such that the NMOS transistors 32, 33 are turned off, in response to either Votp1 from the overheat protection circuit 103 or the voltage Votp2 from the overheat protection circuit 104 going high.

<<Driver Circuit 113>>

The driver circuit 113 outputs the driving signal Vdr1 of the same logic level as that of the signal Vd1 to the terminal HO. Specifically, the driver circuit 113 outputs the high driving signal Vdr1 in response to the high signal Vd1, and outputs the low driving signal Vdr1 in response to the low signal Vd1 (see FIGS. 7 and 8).

In an embodiment of the present disclosure, the voltage Vb is supplied to the driver circuit 113 as power, and the voltage Vs is applied as the ground voltage. Accordingly, the high level of the driving signal Vdr1 corresponds to the level of the voltage Vb, and the low level of the driving signal Vdr1 corresponds to the level of the voltage Vs. The driver circuit 113 outputs the driving signal Vdr1 as such from the terminal HO, to thereby drive the NMOS transistor 32.

<<Driver Circuits 114>>

The driver circuits 114 outputs the driving signal Vdr2 of the same logic level as that of the signal Vd2 to the terminal LO. Specifically, the driver circuits 114 outputs the high driving signal Vdr2 in response to the high signal Vd2, and outputs the low driving signal Vdr2 in response to the low signal Vd2 (see FIGS. 7 and 8).

The pad PD is an electrode to apply power to the driver circuits 114, and is coupled to the terminal A with a wire W2. Accordingly, in an embodiment of the present disclosure, the voltage Vreg1 is supplied as power, and 0 V is applied as the ground voltage, to the driver circuits 114.

As a result, the high level of the driving signal Vdr2 corresponds to the level of the voltage Vreg1, and the low level of the driving signal Vdr1 corresponds to 0 V. The driver circuits 114 outputs the driving signal Vdr2 as such from the terminal LO, to thereby drive the NMOS transistor 33.

Here, the terminal A corresponds to a "first terminal", and the terminal VCC corresponds to a "second terminal". Further, the pad PC corresponds to a "first pad", the pad PB corresponds to a "second pad", and the pad PD corresponds to a "third pad". The switching control circuit 105 corresponds to a "circuit", the driver circuit 113 corresponds to a "first driver circuit", and the driver circuits 114 corresponds to a "second driver circuit". Further, the signal Vd1 corresponds to a "first signal", and the signal Vd2 corresponds to a "second signal".

<<<Operation Waveforms in DC-DC Converter 10 Using Control Block 35a>>>

Figure 9:
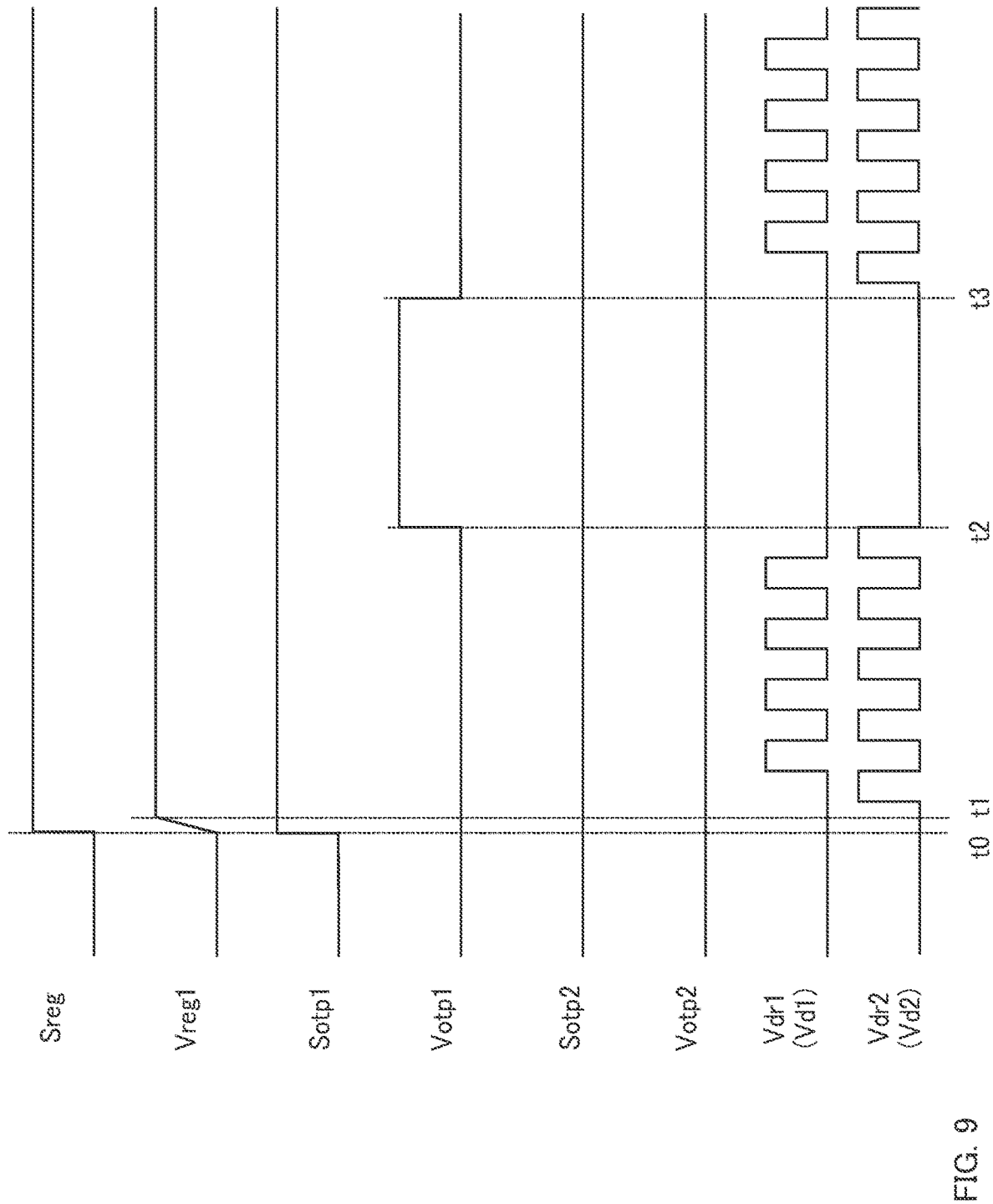

FIG. 9 is a diagram for explaining operation waveforms in the DC-DC converter 10 using the control block 35a. Note that the control IC 50a includes a startup circuit (not illustrated) that generates the power supply voltage Vcc for the control IC 50a, based on external power although it is omitted in FIG. 3. It is assumed that the startup circuit (not illustrated) generates the power supply voltage Vcc based on the external power, before time t0. Further, in an embodiment of the present disclosure, when the control IC 50a is started up, the control circuit 112 operates in the normal mode, based on the information in the storage circuit 111.

After the control IC 50a is started up, the control circuit 112 cause both the signals Sreg, Sotp1 to be high, and causes the signal Sotp2 to be low, at time t0. As a result, the regulator 100 generates the voltage Vreg1 of the predetermined level at time t1.

Further, after the voltage Vreg1 is generated, the control circuit 112 outputs the signals Vd1, Vd2 having a frequency corresponding to the feedback voltage Vfb. As a result, the NMOS transistors 32, 33 are turned on and off, in response to the driving signals Vdr1, Vdr2.

Then, for example, in response to the temperature detected by the diode 211 of the overheat protection circuit 103 exceeding the predetermined temperature Ta at time t2, the overheat protection circuit 103 changes the voltage Votp1 to high. As a result, the control circuit 112 stops generating the signals Vd1, Vd2 (causes both the signals Vd1, Vd2 to be low), to thereby stop driving the NMOS transistors 32, 33.

Further, in response to the temperature detected by the diode 211 of the overheat protection circuit 103 dropping below the predetermined temperature Ta at time t3, the overheat protection circuit 103 changes the voltage Votp1 to low. As a result, the control circuit 112 generates the signals Vd1, Vd2, to thereby resume driving the NMOS transistors 32, 33.

Second Embodiment of Control Block 35

Figure 10:
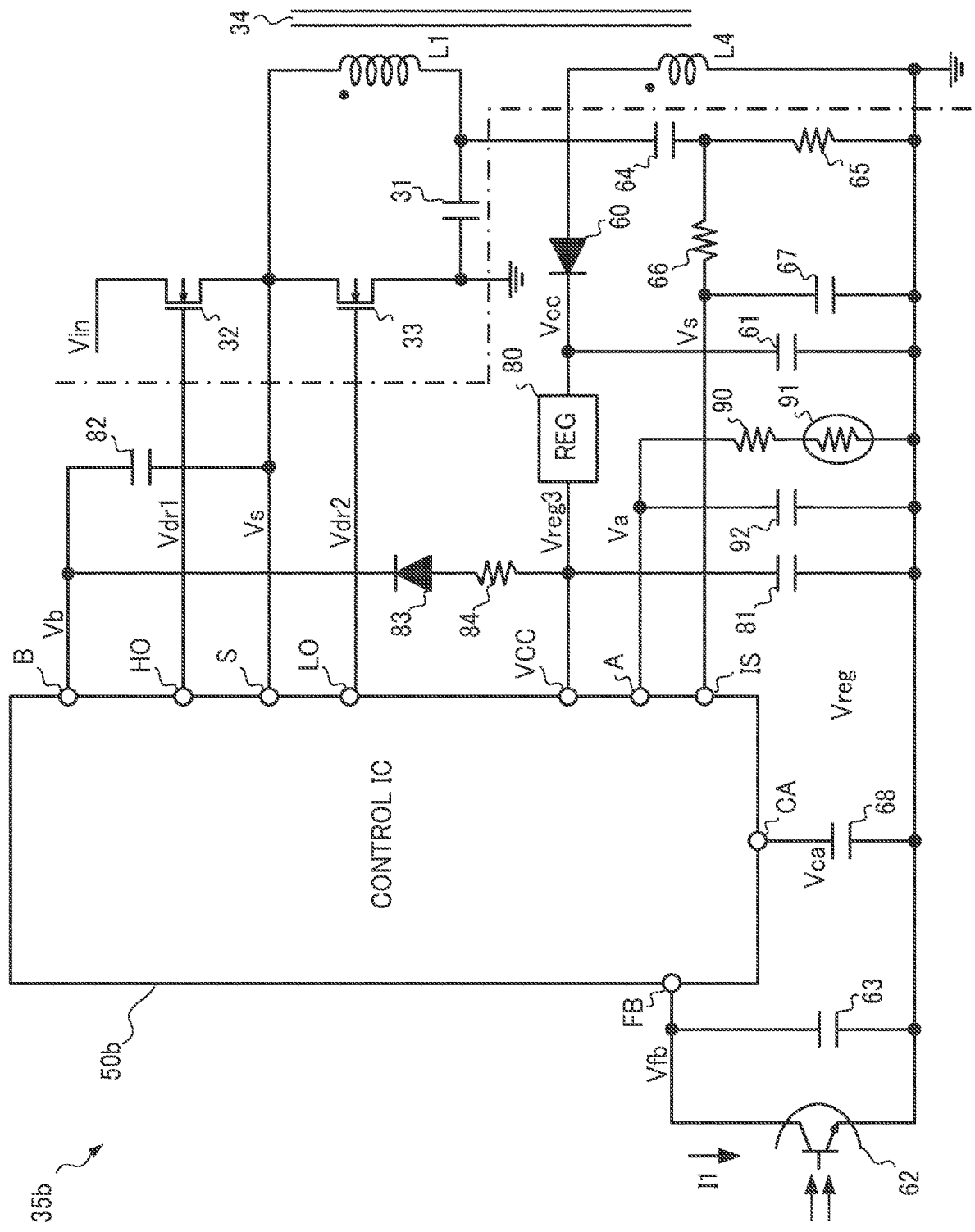
FIG. 10 is a diagram for explaining a control block 35b.

FIG. 10 is a diagram illustrating an example of a control block 35b which is a second embodiment of the control block 35. In FIG. 10, a configuration included in a region on the left side relative to a dashed-dotted line in a paper plane corresponds to the control block 35b. Note that the control block 35b controls the DC-DC converter 10 while using a regulator 80 and a thermistor 91 external to a control IC 50b, which will be described later in detail.

The control block 35b includes the control IC 50b, the diode 60, a diode 83, the capacitors 61, 63, 64, 67, 68, capacitors 81, 82, 92, the phototransistor 62, the resistors 65, 66, resistors 84, 90, the regulator (REG) 80, and the thermistor 91. Note that components that are the same are given the same signs between FIG. 2 and FIG. 10. Thus, here, a description will be mainly given of the regulator 80, the capacitors 81, 82, the diode 83, and the resistor 84, which are coupled to the terminal VCC, and the resistor 90, the thermistor 91, and the capacitor 92, which are coupled to the terminal A.

The regulator 80 is provided between the coupling point of the diode 60 and capacitor 61 and the terminal VCC in the control block 35b. The regulator 80 (REG) generates a voltage Vreg3 of a predetermined level (e.g., 10 V), based on the power supply voltage Vcc of the capacitor 61.

The capacitor 81 is an element to stabilize the voltage Vreg3 of the regulator 80, and is coupled to the terminal VCC and the output node of the regulator 80. Thus, the voltage Vreg3 is applied to the capacitor 81.

The capacitor 82 is an element to generate a bootstrap voltage, as in the capacitor 71 of FIG. 2, and is coupled between the terminal B and the terminal S.

Further, the diode 83 and the resistor 84 are coupled to the terminal B. In an embodiment of the present disclosure, the diode 83 has a cathode coupled to the terminal B, and an anode coupled to the capacitor 81 through the resistor 84.

Accordingly, in response to the voltage Vs at the terminal S reaching the ground voltage (0 V), the capacitor 82 is charged with a current from the regulator 80. Meanwhile, in response to the voltage Vs at the terminal S reaching the voltage Vin, the voltage Vb at the terminal B reaches a voltage higher than the voltage Vin by an amount corresponding to the charge voltage of the capacitor 82.

As such, in the control block 35b, the voltage Vreg3 generated by the regulator 80 external to the control IC 50b results in a power supply voltage to operate the control IC 50b.

The resistor 90 and the thermistor 91 coupled in series with the resistor 90 are coupled to the terminal A. The thermistor 91 is a resistor for temperature detection having a resistance value that decreases with a rise in temperature, for example. The thermistor 91 according to an embodiment of the present disclosure corresponds to a "detection resistor".

The capacitor 92 is an element to stabilize the voltage at the terminal A, and has one end coupled to the terminal A and the other end that is grounded <<<Details of Control IC 50b>>>

Figure 11:
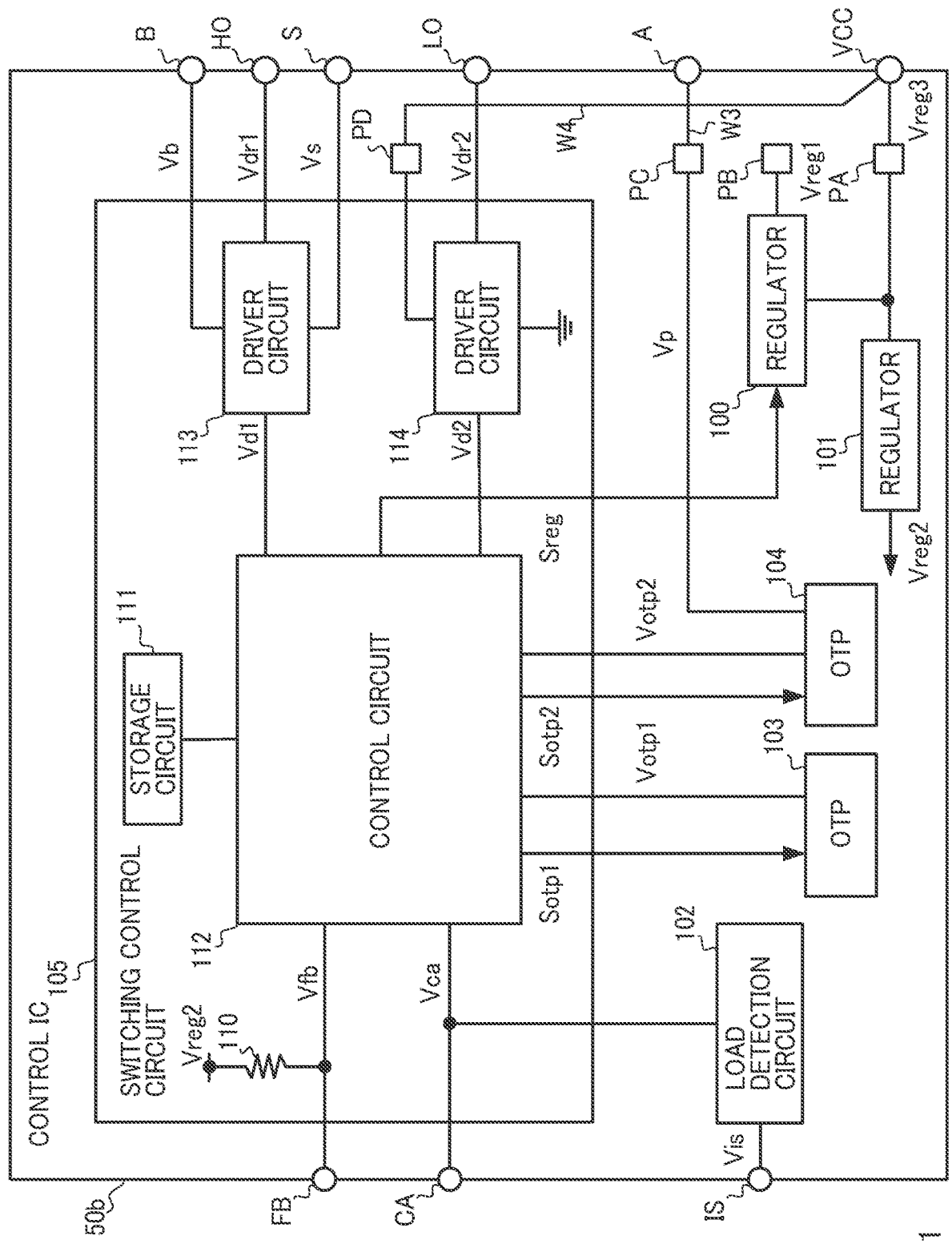
FIG. 11 is a diagram illustrating an example of a control IC 50b.

FIG. 11 is a diagram illustrating a configuration example of the control IC 50b. The control IC 50b includes the regulators 100, 101, the load detection circuit 102, the overheat protection circuits 103, 104, the switching control circuit 105, and the pads PA to PD, as in the control IC 50a of FIG. 3.

When FIG. 3 and FIG. 11 are compared, the voltage applied to the terminal VCC and the coupling state of the pads PB to PD are changed therebetween. Thus, a description will be mainly given of the voltage at the terminal VCC and the coupling state of the pads PB to PD.

The voltage Vreg3 from the external regulator 80 is applied to the terminal VCC, as the power supply voltage to operate the control IC 50b. Further, the pad PA is coupled to the terminal VCC, and thus the regulators 100, 101 operate based on the voltage Vreg3.

The pad PB is not coupled to any of the terminals of the control IC 50b, and thus is in the so-called open state. Accordingly, the voltage Vreg1 is not used in the control IC 50b.

The pad PC is coupled to the terminal A through a wire W3. Accordingly, in the control IC 50b, the current Ib2 from the current source 220 illustrated in FIG. 6 results in flowing to the thermistor 91 through the pad PC, the terminal A, and the resistor 90 (see FIGS. 10 and 11). Accordingly, the voltage Vp at the pad PC varies according to the resistance value of the thermistor 91.

The pad PD is coupled to the terminal VCC through a wire W4. Accordingly, the voltage Vreg3 from the regulator 80 of FIG. 10 is supplied as power for the driver circuits 114.

<<<Operation Waveforms in the DC-DC Converter 10 Using Control Block 35b>>>

Figure 12:
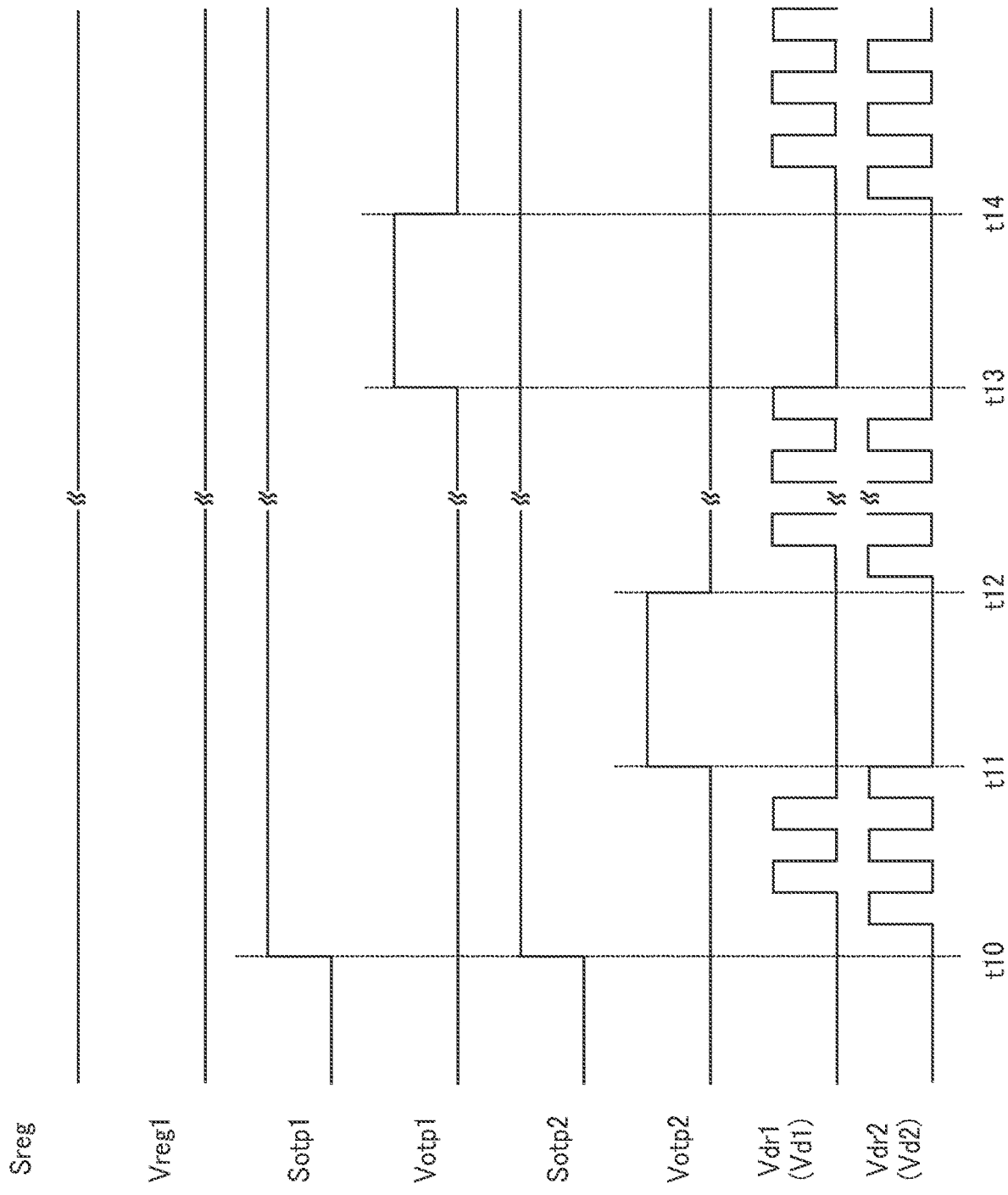
FIG. 12 is a diagram for explaining main waveforms in a control block 35b.

FIG. 12 is a diagram for explaining operation waveforms in the DC-DC converter 10 using the control block 35b. It is also assumed here that the startup circuit (not illustrated) of the control IC 50b generates a predetermined voltage at the terminal VCC, based on external power, before time t10. Further, in an embodiment of the present disclosure, when the control IC 50b is started up, the control circuit 112 operates in the normal mode, based on the information in the storage circuit 111.

After the control IC 50b is started up, the control circuit 112 cause both the signals Sotp1, Sotp2 to be high, and causes the signal Sreg to be low, at time t10. As a result, the regulator 100 is in a state in which its operation is stopped (the state of not generating the voltage Vreg1).

Further, the control circuit 112 outputs the signals Vd1, Vd2 having a frequency corresponding to the feedback voltage Vfb. As a result, the NMOS transistors 32, 33 are turned on and off, in response to the driving signals Vdr1, Vdr2.

Then, for example, in response to the temperature detected by the thermistor 91 exceeding the predetermined temperature Tb at time t1l, the overheat protection circuit 104 changes the voltage Votp2 to high. As a result, the control circuit 112 stops generating the signals Vd1, Vd2 (causes both the signals Vd1, Vd2 to be low), to thereby stop driving the NMOS transistors 32, 33.

As described above, in an embodiment of the present disclosure, the predetermined temperature Tb (e.g., 110° C.) is set lower than the predetermined temperature Ta (e.g., 125° C.). Accordingly, the voltage Vtop2, out of the voltages Votp1, Votp2, goes high according to the temperature.

In response to the temperature detected by the thermistor 91 dropping below the predetermined temperature Tb at time t12, the overheat protection circuit 104 changes the voltage Votp2 to low. As a result, the control circuit 112 generates the signals Vd1, Vd2, to thereby resume driving the NMOS transistors 32, 33.

Here, it is assumed that, for example, such an event in which the thermistor 91 comes off from the terminal A in the timing of from time t12 to t13. Even in such a case, in response to the temperature detected by the diode 211 of the overheat protection circuit 103 exceeding the predetermined temperature Ta at time t13, the overheat protection circuit 103 changes the voltage Votp1 to high. As a result, the control circuit 112 stops generating the signals Vd1, Vd2, to thereby stop driving the NMOS transistors 32, 33.

Further, in response to the temperature detected by the diode 211 dropping below the predetermined temperature Ta at time t14, the overheat protection circuit 103 changes the voltage Votp1 to low. As a result, the control circuit 112 generates the signals Vd1, Vd2, to thereby resume driving the NMOS transistors 32, 33.

As such, in the case where the control IC 50b is used, the overheat protection circuit 103 operates even if the thermistor 91 coupled to the terminal A comes off therefrom, thereby being able to prevent rising of the temperature of the DC-DC converter 10.

===Control IC 50===

Figure 13:
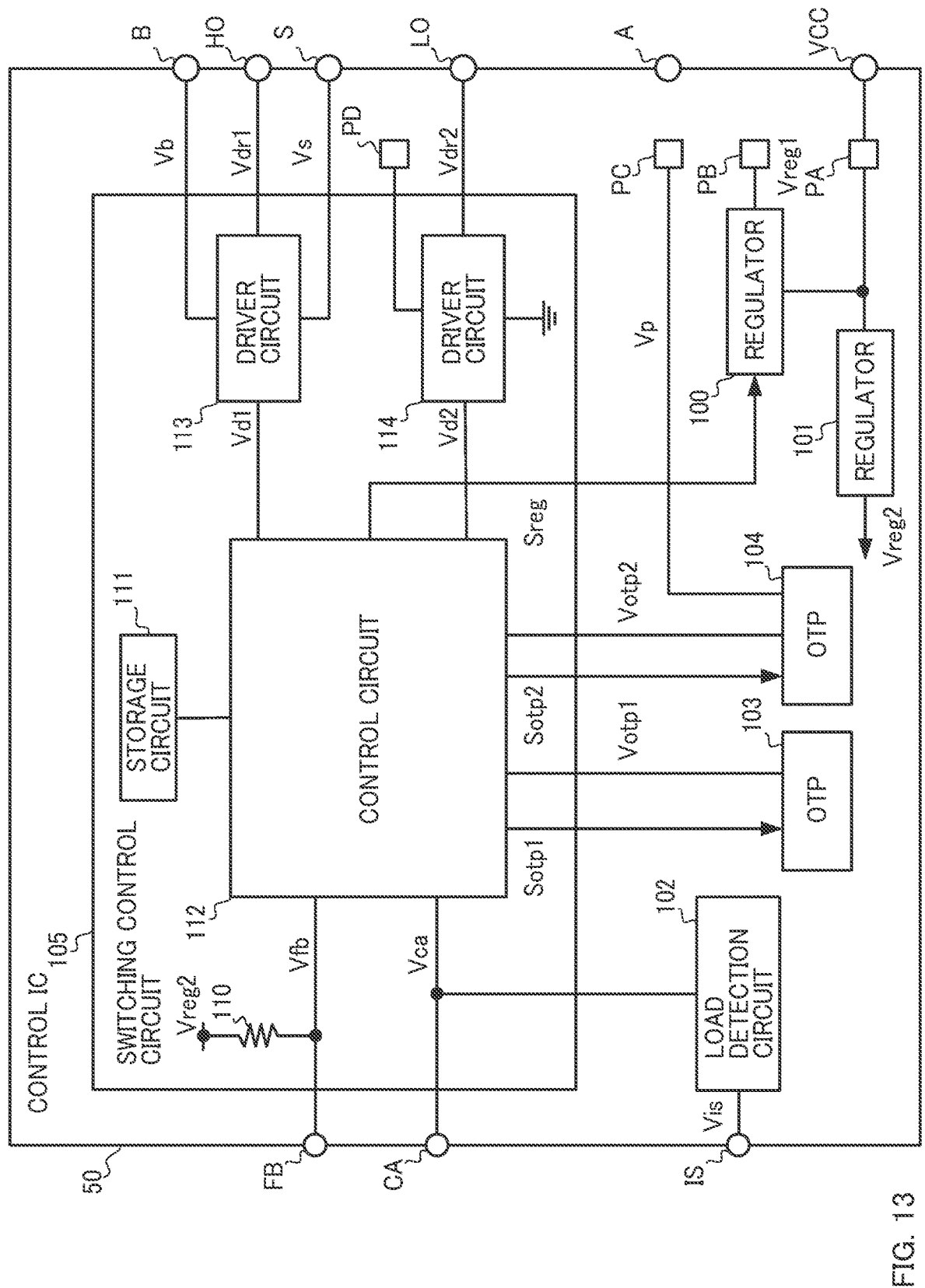
FIG. 13 is a diagram illustrating an example of a control IC 50.

FIG. 13 is a diagram illustrating an example of the control IC 50 according to an embodiment of the present disclosure. In the control IC 50, when the pad PB and the pad PD are coupled to the terminal A, the control IC 50 results in the control IC 50a of FIG. 3. Further, in the control IC 50, when the pad PC is coupled to the terminal A and the pad PD is coupled to the terminal VCC, the control IC 50 results in the control IC 50b of FIG. 11.

As such, in an embodiment of the present disclosure, in the control IC 50, whether the overheat protection circuit 104 and the regulator 100 internal to the control IC 50 are used can be changed, by changing the coupling relationship between the pads and the terminals. Accordingly, a user can implement the DC-DC converter 10 suitable for the user by using the control IC.

SUMMARY

The DC-DC converter 10 according to an embodiment of the present disclosure has been described above. In the control block 35b of FIG. 10 for example, the thermistor 91 and the pad PC are coupled to the terminal A of the control IC 50b. In this case, the switching control circuit 105 operates based on the voltage Votp2 which is a result of detection of the overheat protection circuit 104 (e.g., time t10 to t12 in FIG. 12). Meanwhile, in the control block 35a of FIG. 2, the pad PC is not coupled to the terminal A of the control IC 50a. In this case, the switching control circuit 105 operates based on the voltage Votp1 which is the result of detection of the overheat protection circuit 103 (e.g., FIG. 9). Accordingly, a user can select a temperature detection method suitable for the user by using the control IC 50 of FIG. 13.

Note that a case in which the thermistor 91 and the pad PC are coupled to the terminal A corresponds to a "first case", and a case in which the pad PC is not coupled to the terminal A corresponds to a "second case".

Further, in the control block 35a of FIG. 2, the pad PB and the capacitor 70 are coupled to the terminal A of the control IC 50a. Accordingly, for example, when a user uses the overheat protection circuit 103 internal to the control IC 50a, the regulator 100 internal to the control IC 50a can be used. As a result, in the case of the control block 35a, there is no need to provide an external regulator.

Note that the case in which the pad PB and the capacitor 70 are coupled to the terminal A corresponds to the "second case".

Further, as in the control block 35a of FIG. 2, in the case in which the internal regulator 100 is used and the pad PB is coupled to the terminal A, the pad PD is coupled to the terminal A. Meanwhile, as in the control block 35b of FIG. 10, in the case in which the external regulator 80 is used and the pad PC is coupled to the terminal A, the pad PD is coupled to the terminal VCC. As a result, the switching control circuit 105 can output the driving signal Vdr2 corresponding to the voltage applied to the pad PD.

Further, in an embodiment of the present disclosure, it is assumed that the switching control circuit 105 operates based on the voltages Votp1, Votp2 of the overheat protection circuits 103, 104. However, an arithmetic circuit, such as a typical microcomputer, CPU, etc., may operate based on the outputs of the overheat protection circuits 103, 104.

Further, the switching control circuit 105 stops switching the NMOS transistors 32, 33, in response to either the voltage Votp1 of the overheat protection circuit 103 or the voltage Votp2 of the overheat protection circuit 104 going high. This makes it possible to protect the DC-DC converter 10 from overheating.

Further, the switching control circuit 105 can include a control circuit configured to generate the signals Vd1, Vd2, and the driver circuits 113, 114.

Further, the overheat protection circuit 104 that uses the thermistor 91 causes the switching control circuit 105 to stop a switching operation, in response to the temperature reaching the predetermined temperature Tb. Further, in an embodiment of the present disclosure, the predetermined temperature Tb is lower than the predetermined temperature Ta. Accordingly, a user can prevent the DC-DC converter 10 from heating more, with the thermistor 91 external to the control IC 50 being coupled thereto.

Further, in the DC-DC converter 10, in the case where the control IC 50*b* is used, such an event in which the thermistor 91 comes off from the terminal A may occur. Even if such a phenomenon occurs, the overheat protection circuit 103 stops the switching operation of the switching control circuit 105, in response to the temperature reaching the predetermined temperature Ta. Accordingly, with the use of the control IC 50*b*, it is possible to reliably prevent the DC-DC converter 10 from being broken by heat.

The present disclosure is directed to provision of an integrated circuit capable of selecting a temperature detection method that is suitable for a user.

According to the present disclosure, it is possible to provide an integrated circuit capable of selecting a temperature detection method that is suitable for a user.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit that includes a detection resistor having a resistance value for temperature detection, the integrated circuit comprising:
   a first pad;
   a first terminal configured to be electrically connected to the detection resistor and the first pad in a first case, and be electrically separated from the first pad in a second case;
   a first temperature detection circuit having a temperature detection element, the first temperature detection circuit being configured to detect a first temperature, based on a voltage of the temperature detection element;
   a second temperature detection circuit configured to detect a second temperature, based on a first voltage corresponding to the resistance value of the detection resistor, received through the first pad in the first case; and
   a circuit configured to operate based on a result of detection of the second temperature detection circuit and that of the first temperature detection circuit, respectively in the first case and in the second case.

2. The integrated circuit according to claim 1, wherein the power supply circuit further includes a capacitor; and the integrated circuit further includes:
   a second pad; and
   a regulator coupled to the second pad, wherein
   the second pad and the capacitor are coupled to the first terminal in the second case, and
   the regulator applies a second voltage to the first terminal through the second pad, in the second case.

3. The integrated circuit according to claim 2, further comprising:
   a second terminal configured to receive a power supply voltage; and
   a third pad configured to
      be coupled to the second terminal in the first case, and
      be coupled to the first terminal in the second case, wherein
   the circuit further operates based on a voltage received at the third pad.

4. The integrated circuit according to claim 3, wherein the power supply circuit further includes
   an inductor, and
   first and second transistors configured to control
   an inductor current flowing through the inductor, the integrated circuit being configured to control switching of the first and second transistors, to thereby generate an output voltage at a target level from an input voltage thereof, and
   the circuit is a switching control circuit configured to control the switching of the first and second transistors, based on a feedback voltage corresponding to the output voltage.

5. The integrated circuit according to claim 4, wherein
   the first temperature detection circuit is configured to detect whether the first temperature is higher than a first predetermined temperature, based on the voltage of the temperature detection element,
   the second temperature detection circuit is configured to detect whether the second temperature is higher than a second predetermined temperature, based on the first voltage, and
   the switching control circuit is configured to
      stop switching the first and second transistors, in response to the second temperature exceeding the second predetermined temperature, in the first case, and
      stop switching the first and second transistors, in response to the first temperature exceeding the first predetermined temperature, in the second case.

6. The integrated circuit according to claim 5, wherein the switching control circuit includes
   a control circuit configured to output a first signal for controlling switching of the first transistor on a power supply side and a second signal for controlling switching of the second transistor on a ground side, based on the feedback voltage, the result of detection of the first temperature detection circuit, and the result of detection of the second temperature detection circuit,
   a first driver circuit configured to drive the first transistor, in response to the first signal, and
   a second driver circuit configured to drive the second transistor, in response to the second signal, the second driver circuit being configured to turn on the second transistor, with a voltage corresponding to the voltage received at the third pad.

7. The integrated circuit according to claim 5, wherein the second predetermined temperature is lower than the first predetermined temperature.

8. A power supply circuit configured to generate an output voltage at a target level from an input voltage thereof, the power supply circuit comprising:
- an inductor;
- first and second transistors configured to control an inductor current flowing through the inductor;
- an integrated circuit having a first terminal, the integrated circuit being configured to control switching of the first and second transistors; and
- a detection resistor for temperature detection coupled to the first terminal, wherein the integrated circuit includes
- a first temperature detection circuit having a temperature detection element, the first temperature detection circuit being configured to detect whether a first temperature of the integrated circuit is higher than a first predetermined temperature, based on a voltage of the temperature detection element,
- a second temperature detection circuit configured to detect whether a second temperature of the integrated circuit is higher than a second predetermined temperature, based on a first voltage corresponding to a resistance value of the detection resistor,
- a switching control circuit configured to stop the switching of the first and second transistors, in response to the first temperature detection circuit detecting the first predetermined temperature or the second temperature detection circuit detecting the second predetermined temperature.

* * * * *